United States Patent [19]

Meyer

[11] Patent Number: 4,725,238
[45] Date of Patent: Feb. 16, 1988

[54] MOUNTING BRACKET APPARATUS

[76] Inventor: Bruce A. Meyer, 1811 Cobblestone, Houston, Tex. 77469

[21] Appl. No.: 897,840

[22] Filed: Aug. 19, 1986

[51] Int. Cl.⁴ .......................................... H01R 39/00
[52] U.S. Cl. .......................................... 439/8; 439/13; 439/476; 439/534; 248/288.3
[58] Field of Search .......................................... 339/1-8, 339/92, 119 L, 120, 125 R, 125 L, 126 R, 126 J, 126 RS, 147 R, 108 R, 108 L, 47, 48, 49 R; 362/419-427, 66, 297, 30.5; 248/288.3, 288.5, 481, 483

[56] References Cited

U.S. PATENT DOCUMENTS

| 424,572 | 4/1890 | Painter | 248/288.5 |
| 1,492,682 | 5/1924 | Foster | 362/421 |
| 1,577,153 | 3/1926 | Aldeen | 362/421 |
| 1,656,419 | 1/1928 | Chamberlain | 362/66 |

FOREIGN PATENT DOCUMENTS 231357  4/1925  United Kingdom .............. 362/421

Primary Examiner—Gil Weidenfeld
Assistant Examiner—David Pirlot
Attorney, Agent, or Firm—Dodge, Bush & Moseley

[57] ABSTRACT

A mounting bracket apparatus adapted for movably mounting a spot light or the like on a vehicle. A ball support is formed of substantially identical hemispheres is positioned on the vehicle. First and second substantially identical socket assemblies are disposed on opposite sides of the ball member and operably connected. One of the socket assemblies mounts the spot light while the other mounts a user manipulative handle. This arrangement enables a combination of desired tilt and rotational movement to provide a continuous range of movement of the spot light.

3 Claims, 3 Drawing Figures

MOUNTING BRACKET APPARATUS

BACKGROUND OF THE INVENTION

1. Field of the Invention

The present invention relates generally to the field of mounting brackets and more particularly to mounting brackets for variable positioning of the mounted device.

2. Background Art

U. S. Pat. No. 1,420,075 to Berge is entitled "Lamp Support". The disclosed lamp support mount is hand manipulated in movement and may be mounted for use on cars, trucks, boats and the like. The mounted lamp may be directed or positioned to illuminate any desired location without exiting the vehicle. The mounted light is movable rotatably in a horizontal plane as well as in a plane inclined to the horizontal plane to provide a universal movement mounting and support arrangement. The mounting arrangement employs an inner and outer spherical member through which a mounting shaft extends. The portion of the shaft located in the vehicle carries the operator manipulating or positioning control handle while the exterior portion of the shaft mounts the light fixture.

U. S. Pat. No. 1,390,350 to Evans also discloses a spotlight mounting apparatus that provides for adjustable movement of the light beam. The universal movement enabling ball and socket mounting mechanism is located in an opening formed in the vehicle panel. The large panel opening required for mounting the movable ball is difficult to seal and requires an unsightly patch if the mounting apparatus is ever removed from the vehicle. A separate wing nut on the fixed socket is provided for controlling the friction holding force of the socket on the ball for maintaining the light in the desired position.

U. S. Pat. No. 1,333,432 to Maier is entitled "VISE" and discloses a ball and socket arrangement for mounting the vise. The body of the vise is positioned at the desired location and then locked in position using radially expandable dogs mounted internally of the ball.

U. S. Pat. No. 424,572 to Painter is entitled "Canopy Holder". The fixed ball element is formed of a pair of hemispheres that are clamped about a support rod. The threaded socket like clamping assembly extends through the ball and around the support rod. The support arms are attached to the clamping assembly to enable positioning and locking at the desired position.

U. S. Pat. No. 1,492,682 to Foster is entitled "Dirigible Spotlight." The disclosed light mounting assembly employs a pair of mated hemispherical elements that are clamped on either side of a vehicle panel. A connecting shaft extends through an opening in the panel and the hemisphere. An exterior socket connected to the shaft mounts the light while the end of the shaft disposed in the interior of the vehicle mounts the manipulating handle and connecting shaft tensioning mechanism.

SUMMARY OF THE INVENTION

The present invention relates to the field of a mounting apparatus that is particularly well suited for use on motor vehicles, boats and the like.

The mounting apparatus is of the ball and socket type for providing universal movement with the ball formed of identical hemispheres positioned on opposite sides of a relatively thin mounting panel. An operating and manipulative connecting shaft extends through openings formed in the hemispheres and a small opening formed in the mounting panel. The exterior end portion of the shaft is connected to an exterior movable socket assembly which bears on the external hemisphere and mounts the light or other desired apparatus. The other end of the connecting shaft extends into the interior of the vehicle and is operably secured to the companion interior movable socket and which mounts the manipulating handle. The interior end of the shaft also enables adjustable tensioning of the socket contact with the ball to control the holding friction between the ball and socket. The resulting mounting bracket is simple and inexpensive in construction and may be easily installed or demounted from the vehicle.

DESCRIPTION OF THE PREFERRED EMBODIMENT

Figure 1:
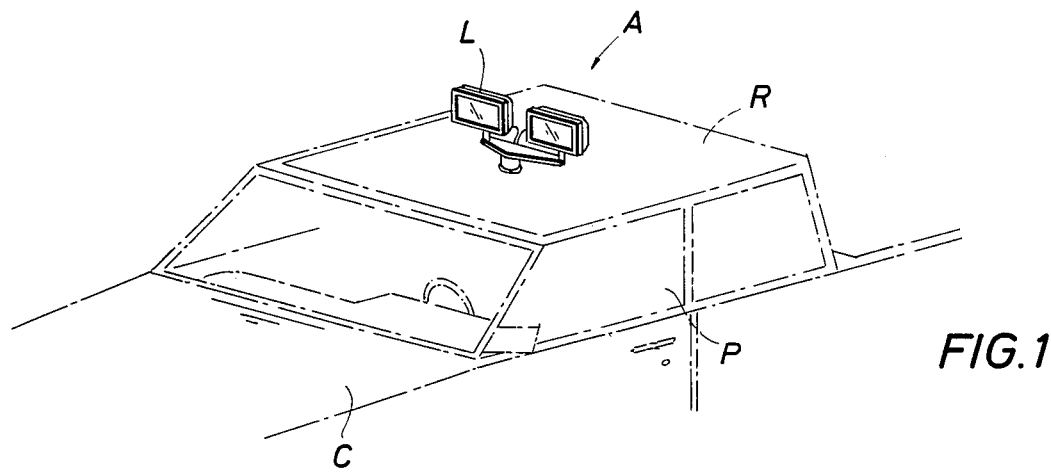
FIG. 1 is a perspective view of the mounting bracket assembly operably installed on a passenger vehicle.

The mounting bracket apparatus of the present invention, generally designated A, is illustrated operably mounted on a roof R of a passenger motor vehicle or car C in FIGS. 1. It is to be understood that the mounting bracket apparatus A may be mounted at any desired location on the car C and is not limited to the roof R. Likewise, the apparatus A may be mounted on any type of vehicle, such as but not limited to trucks, boats, helicopters and the like and is not limited to cars or automobiles. In addition the manipulating mechanism need not be positioned in the passenger compartment P of the car C although that is the preferred arrangement and the arrangement in which the apparatus A will be described herein. While spotlight units L are illustrated mounted by the apparatus A on the car C, it will also be apparent that other devices, such as a television camera, may also be mounted.

To mount the apparatus A on the car C, a relatively small substantially flat portion of a relatively thin panel, such as the metal roof R is provided with an opening O. The opening O is preferably drilled to a relatively small diameter of approximately three quarters of an inch. This enables a relatively simple repair in the event the apparatus A is removed or demounted from the car C.

The apparatus A includes a fixed ball support assembly generally designated 10, and a first or interior socket assembly designated 12 and a second or exterior socket assembly 14. As will be explained in greater detail, the inner and outer socket assemblies 12 and 14 are movably mounted on the ball support 10 and are operably connected by a threaded shaft assembly 16 which extends through the opening O in the roof R.

The ball support assembly 10 is preferably formed by a pair of substantially hollow hemispheres 20 and 22. For manufacturing purposes the hemisphere 20 and 22 are preferably identical and only the hemisphere 22 mounted externally of the passenger compartment P will be described in detail. Like features of the interior hemisphere 20 will be designated with similar reference characters having the prefix 20 instead of 22.

Figure 3:
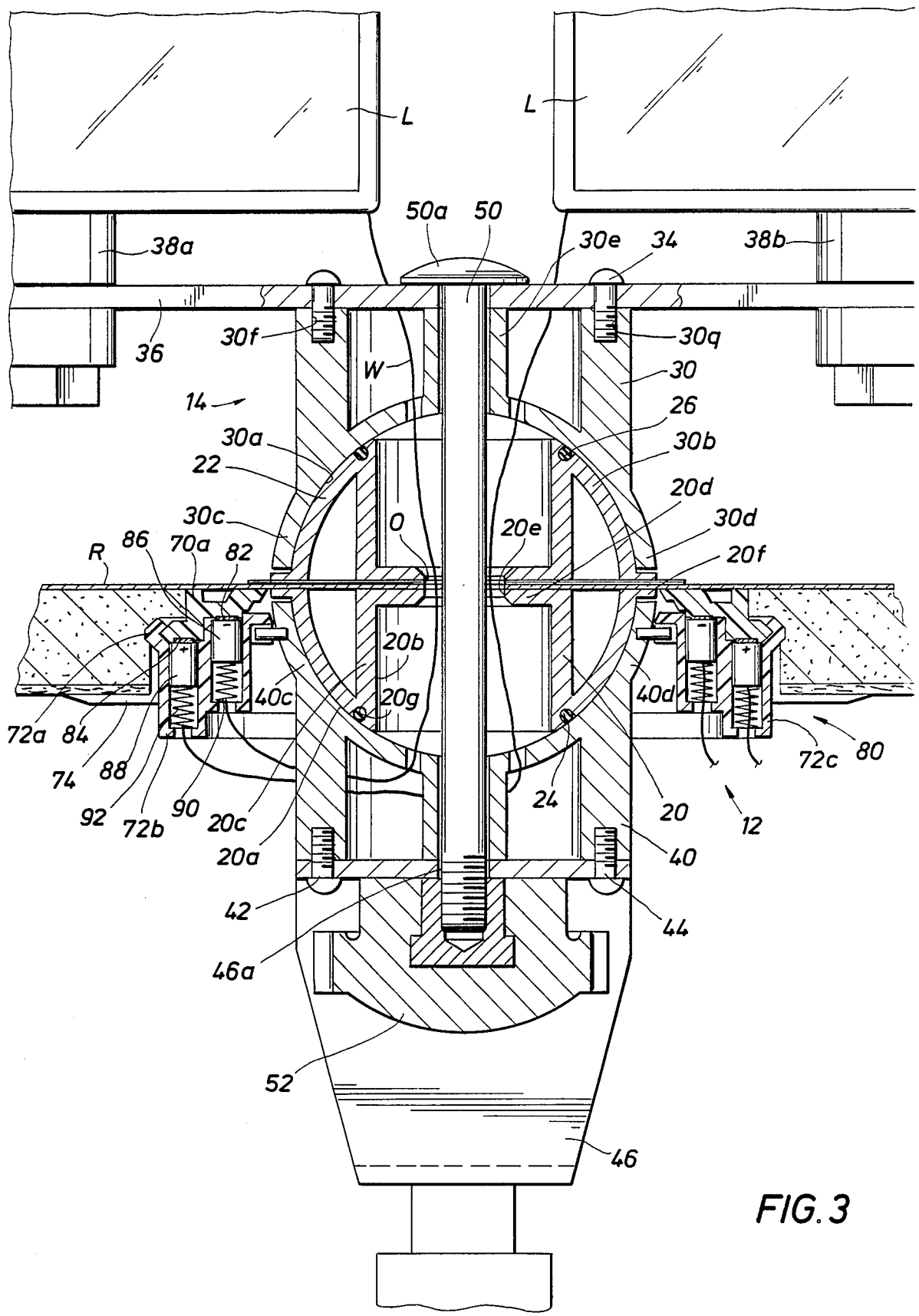
FIG. 3 is a section view taken along lines 3—3 of FIG. 2.

As best illustrated in FIG. 3, the hemisphere 20 is provided with an outer spherical mounting surface 20a and a central opening 20b. The opening 20b is preferably formed by a tubular supporting rib 20c having an inwardly projecting annular support collar 20d. The collar 20d forms an opening 20e that is placed in alignment with the roof opening O and through which the shaft 16 extends. If desired, an external support rib 20f may be provided for a purpose to be described hereinafter.

The outer spherical surface 20a provides the sliding movement support surface for the outer or external bracket assembly 14. The outer spherical surface 20a enables a desired range of universal movement of the engaged adjacent socket assembly 12 in the conventional manner. Adjacent the opening 20b the spherical surface 20a is provided with an annular groove 20g for receiving an O-ring 24 (the identical O-ring 26 is used on hemisphere 22) for sealing between the outer socket assembly and the hemisphere 20. The sliding seal effected by O-ring 24 prevents leakage of fluid into the opening 20b and on into the passenger compartment P of the car C through opening O.

If desired the O-rings 24 and 26 may be used as centering reference for positioning the apparatus A when not in use. By providing a slight indentation or groove in the arcuate surface of the tubular assemblies that are brought into registry with the O-rings 24 and 26 when the shaft assembly 16 is in the vertical position, the O-rings will expand into the grooves. With experience, the user can feel this centering memory. In such position the tubular assemblies 14 and 16 are freely rotatable, but a slight additional force is needed to deform the O-rings 24 and 26 to effect tilting.

Figure 2:
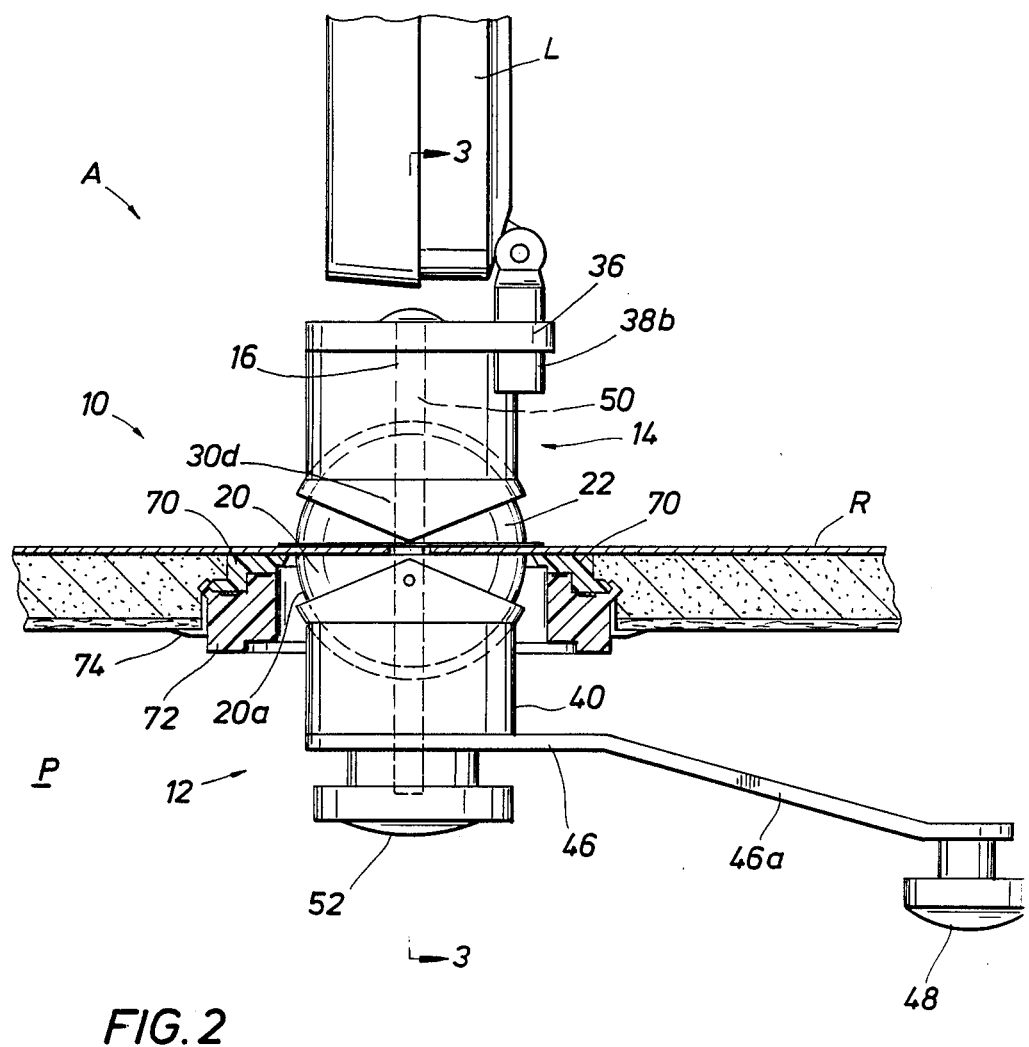
FIG. 2 is a side view in section of the mounting bracket apparatus.

The outer socket assembly 14 includes a tubular body member 30 forming an arcuate or spherical surface 30a that engages and slides on the complementary spherical surface 22a of the hemisphere 22. The tubular member 30 is preferably formed with a skirt 30b that forms the spherical surface 30a and provides a pair of downwardly extending tapered pivot movement control extensions or supports 30c and 30d that engage the support lip 20f on the ball, if provided, or the roof R (FIG. 2). The supports 30c and 30d cooperate to limit angular or tilt movement of the socket assembly 14 on the ball 22 in conjunction with similar or identical structure formed on the socket assembly 12 and aligned therewith.

For structural rigidity and to maintain alignment, the tubular member 30 is provided with an inner sleeve 30e that extends upwardly from the skirt 30b and is concentrically spaced from the tubular body member 30. For manufacturing purposes the tubular body member 30, sleeve 30e and skirt 30b are preferably molded or fabricated as a unitary structure.

The tubular sleeve 30 is drilled and tapped at 30f and 30g for receiving machine mounting bolts 32 and 34 which secure the support member 36 to the tubular member 30 and which may be self-tapping. The conventional sealed beam spot light units L are fixed or bolted to 38a and 38b to the support member 36 in the conventional manner. The support member 36 is aligned with the skirt extensions 30c and 30d to limit tilt movement of light units L to forward and backward movement and prevents canting of the support member. Movement of the tubular member 30 on the hemisphere 20 provides a desired rotational and inclination movement to the support member 36 to enable universal movement or positioning of the spot light units L. During operation the apparatus is preferably rotated to the desired direction or azimuth and then tilted to the desired angle. An experienced operator can and may perform these operations or manipulations simultaneously or in reverse order.

The tubular member 40 is preferably substantially identical in construction to the tubular member 30, but is mounted on the hemisphere 20. Rather than a support member 36, the inner socket assembly 12 includes a handled end cap or manipulating member 46 that is securely mounted by machine bolts 42 and 44. The end cap 46 forms an opening 46a for the connecting assembly 16 to be described shortly. The manipulating member 46 also forms an outwardly extending arm or lever 46b to provide suitable leverage for the operator in manipulating the tubular member 40 to rotate or tilt the apparatus A. A rotatably mounted operating knob 48 may also be provided on lever 46b for the users convenience during operation.

The inner and outer socket assemblies 12 and 14 are operably connected as a rigid unit for pivoting and rotational movement about the ball support 10 by the shaft connecting assembly 16 which is formed by a threaded bolt or shaft 50 and a tension adjusting threaded knob 52. The machine bolt 50 has an enlarged square head 50a which bears against the support member 36 adjacent square opening 36a and which extends through the opening 46a of the handle member 46 where it threadedly engages the tension adjusting knob 52. If desired the portion of the bolt 50 adjacent the knob 52 cut away to provide lock shoulder (not illustrated) in engagement with the non-circular opening 46a. Rotational tightening of the knob 52 increases the tension on the bolt 50 in the usual manner. This single arrangement adjusts and control the force of the tubular members 30 and 40 on the hemisphere 22 and 20 respectively and provides sufficient friction force to hold the support member 36 and light L in the desired orientation.

In FIG. 2 a decorative faceplate for use with the present invention is illustrated. During installation the car headliner or roof upholstery H is removed in a circular pattern adjacent the opening O. Prior to installing the apparatus A, a resiliently deformable base or securing ring 70 is fixed to the interior side of the roof R concentric of the opening O. Any conventional securing means of the ring 70 to the roof R may be used, but adhesive is preferred. A visually attractive protective outer ring 72 is then forcibly installed on the securing ring 70 by resilient deformation of one or both of the rings 70 and 72. A headliner cover plate ring 74 may then be slipped tightly around the protective ring 72.

In FIG. 3 a modified form of the coverplate arrangement is disclosed which provides rotary electrical contact brushes to eliminate limitation on rotational movement by electrical wiring W running to the lamp units L. If desired, such wires W may be run directly through the opening O, ball openings 20 and 22, and through opening drilled in the skirts 30a and 40a. With sufficient slack in the wiring W an adequate, but limited, range of rotational movement is available. The electrical contact arrangement of FIG. 3 avoids such limitation on movement, but at increased cost.

The rotary electrical brush means, generally designated 80, includes first and second electrical conductor or slip rings 82 and 84 that are concentrically spaced and electrically insulated on fixed securing ring 70a. The surrounding or outer ring member 82 is pivotally fixed to the skirt extension 40c and rotates with the lower socket assembly 16. The outer ring 82a forms a suitable housing 82b in which conventional electrical contact brushes 86 and 88 are movably mounted for effecting the desired separate electrical contact with rings 82 and 84, respectively. Biasing springs 90 and 92 may be provided to maintain the contact brushes in electrical contact with the rings 82 and 84 in the usual manner. The embodiment illustrates two separate electrical flow path circuits, but more or only one electrical control circuits may be provided as desired. To insure continuous uninterrupted power supply to the lamp units, an identical housing 72c with contact brushes may be pivotally mounted on the other skirt extension 40d.

From the drawings it is apparent that the hemispheres 20 and 22 are formed substantially identical. Likewise the tubular socket assemblies 14 and 12 are substantially identical. This greatly simplifies manufacturing and repair and reduces the associated costs. The term "substantially" is used in this regard although these items are identical and interchangeable to cover variations in minor details of construction, location and size of openings, provisions for additional features or the like.

The foregoing disclosure and description of the invention are illustrative and explanatory thereof, and various changes in the size, shape and materials, as well as in the details of the illustrated construction, may be made without departing from the spirit of the invention.

What is claimed is:

1. A mounting bracket apparatus adapted for externally mounting a preselected unit for enabling hand manipulation by a user to position the mounted unit in a desired direction, including:
   a ball support assembly formed of a first and a second hemisphere disposed on opposite sides of a mounting panel, each of said hemispheres having a spherical surface and an opening formed therethrough, said openings aligned with each other and with an aperture in the mounting panel and with said spherical surface of one of said hemispheres disposed away from the mounting panel;
   a first socket assembly having an arcuate surface in sliding contact with said spherical surface of said first hemisphere;
   a second socket assembly having an arcuate surface in sliding contact with said spherical surface of said second hemisphere;
   a connecting assembly extending through said aligned openings of said hemispheres for operably connecting said first socket assembly and said second socket assembly for effecting coordinated sliding movement of said first and second socket assemblies on said contacted spherical surfaces;
   said first socket assembly having a handle mounted thereon for grasping by a user to manipulate said first and second socket assemblies for effecting sliding movement of said socket assemblies on said contacted spherical surfaces as desired;
   said second socket assembly having a support member with the unit mounted thereon to be oriented in the desired direction;
   said connecting assembly having a threaded portion disposed adjacent said first socket assembly, said first socket assembly mounting an adjustable thread engaging member for controlling the tension force on said connecting assembly imparted to said arcuate surfaces of said first and second socket assembly with said spherical surfaces on said hemispheres of said ball support assembly;
   said first socket assembly having a pair of pivot support extensions disposed on opposite sides of said ball support assembly and located adjacent said spherical surface of said ball support assembly for limiting angular inclination of said first socket assembly on said ball support assembly; and
   said second socket assembly having a pair of pivot support extensions disposed on opposite sides of said ball support assembly and aligned with said pair of pivot support extensions of said first socket assembly for limiting angular inclination of said second socket assembly on said ball support assembly.

2. A mounting bracket apparatus adapted for externally mounting a preselected unit for enabling hand manipulation by a user to position the mounted unit in a desired direction, including:
   a ball support assembly formed of a first and a second hemisphere disposed on opposite sides of a mounting panel, each of said hemispheres having a spherical surface and an opening formed therethrough, said openings aligned with each other and with an aperture in the mounting panel and with said spherical surface of one of said hemispheres disposed away from the mounting panel;
   a first socket assembly having an arcuate surface in sliding contact with said spherical surface of said first hemisphere;
   a second socket assembly having an arcuate surface in sliding contact with said spherical surface of said second hemisphere;
   a connecting assembly extending through said aligned openings of said hemispheres for operably connecting said first socket assembly and said second socket assembly for effecting coordinated sliding movement of said first and second socket assemblies on said contacted spherical surfaces;
   said first socket assembly having a handle mounted thereon for grasping by a user to manipulate said first and second socket assemblies for effecting sliding movement of said socket assemblies on said contacted spherical surfaces as desired;
   said second socket assembly having a support member with the unit mounted thereon to be oriented in the desired direction;
   said connecting assembly having a threaded portion disposed adjacent said first socket assembly, said first socket assembly mounting an adjustable thread engaging member for controlling the tension force on said connecting assembly imparted to said arcuate surfaces of said first and second socket assembly with said spherical surfaces on said hemispheres of said ball support assembly;
   said first socket assembly having a pair of pivot support extensions disposed on opposite sides of said ball support assembly and located adjacent said spherical surface of said ball support assembly for limiting angular inclination of said first socket assembly on said ball support assembly; and
   a first electrical conductor ring concentrically mounted exteriorly of said first hemisphere; and
   a first electrical contact means mounted with said first socket assembly for movably engaging said first electrical conductor ring to form an electrical flow path, said first electrical contact means mounted on and movable with at least one of said extension supports of said first socket assembly for maintaining continuous electrical contact during manipulated rotational movement of said first and second socket assemblies on said ball assembly.

3. The apparatus as set forth in claim 2, including:
a second conductor ring concentrically mounted exteriorly of and electrically insulated from said first conductor ring; and
a second electrical contact means for movably engaging said second electrical conductor ring to form a second electrical flow path, said second electrical contact means mounted on and movable with at least one of said extension supports of said first socket assembly for maintaining continuous electrical contact during manipulative rotation movement of said first and second socket assemblies on said ball support assembly.

* * * * *